Patented July 14, 1936

2,047,597

UNITED STATES PATENT OFFICE 2,047,597

VARNISH

Henry S. Rothrock, Wilmington, Del., assignor to E. I. du Pont de Nemours & Company, Wilmington, Del., a corporation of Delaware No Drawing. Application October 16, 1934, Serial No. 748,454

15 Claims. (Cl. 134—26)

This invention relates to varnishes and more particularly to varnishes containing alcohols derivable by hydrogenation from natural acidic resins.

In the manufacture of varnishes, oils and resins are heated together and then thinned with a high boiling solvent to furnish varnishes which dry to hard glossy films impervious to air and moisture. Varnishes made from natural resins have certain disadvantages, including a darker color and a higher viscosity than is desirable in many instances.

This invention has as an object the preparation of varnishes of lower viscosity at corresponding solids content than the varnishes heretofore utilized. A further object is the preparation of varnishes lighter in color than the prior art varnishes. A still further object is the preparation of varnishes of improved drying properties. A still further object is the preparation of varnishes drying to films having more desirable film properties than those of the prior art. Other objects will appear hereinafter.

These objects are accomplished by the following invention wherein an alcohol derivable from a natural acidic resin by hydrogenation, such as abietyl or hydroabietyl alcohols, is combined with a drying oil by heating or by means of mutual solvents, then thinned with an appropriate varnish solvent to the proper consistency to furnish a varnish containing the alcohol derivable from the natural acidic resin together with a drying oil.

It has been discovered that abietyl and hydroabietyl alcohols are excellent replacements for natural and synthetic resins in the manufacture of oleoresinous varnishes, and that these varnishes can be made from abietyl and hydroabietyl alcohols by the use of the regular varnish procedures. The abietyl and hydroabietyl alcohols are not mere substitutes for the natural and synethetic resins but possess improved properties which readily distinguish them from varnishes made from the corresponding natural gums, e. g., rosin, in that they possess much superior drying qualities, have lower viscosities at corresponding solids contents, and are lighter in color. In the case of abietyl alcohol films cast from varnishes containing this material have higher gloss and better apparent build than films cast from varnishes containing rosin.

Having set forth the principles and purposes of the invention, the following exemplifications thereof are added for purposes of illustration but not in limitation:

Example 1

A mixture of 12.5 parts by weight of abietyl alcohol and 24.5 parts by weight of China-wood oil was heated to 225° C. and held at that temperature for approximately 20 minutes. The mixture was then cooled to about 200° C. and thinned with an equal weight of a solvent mixture comprised of equal parts of Hi-flash naphtha and turpentine substitute. When the varnish had cooled to room temperature, a sufficient amount of cobalt linoleate drier solution was added to give 0.01% cobalt, based on the weight of the oil, and the resulting varnish applied over steel and over stained, filled mahogany. The varnish dried tack-free to a hard, clear, flexible film in two hours.

A varnish similar to the above, but containing rosin in place of the abietyl alcohol required four hours to dry to the tack-free stage. The abietyl alcohol varnish of the above example had a color index of 3.4 on the "Gardner-Holdt" scale as compared to 6.2 for the similar rosin varnish.

Example 2

A mixture of 12.5 parts by weight of China-wood oil, 12 parts by weight of linseed oil, and 12.5 parts by weight of abietyl alcohol was heated to 250° C., and held at that temperature for about 15 minutes, at the end of which time the mixture was removed from the fire, cooled to about 200° C. and reduced with an equal weight of a 1:1 mixture of Hi-flash naphtha and turpentine substitute. When the varnish had cooled to room temperature, a sufficient quantity of cobalt linoleate drier solution to give 0.01% cobalt, based on the weight of the oil, was added. The varnish thus prepared was sprayed on steel and over filled, stained mahogany. The varnish dried tack-free in about five hours to a tough, hard, clear film. A varnish similar but containing rosin required about seven hours to dry to the tack-free state, and was definitely darker in color than the varnish containing abietyl alcohol.

Example 3

A mixture of 12.5 parts by weight of abietyl alcohol and 49 parts by weight of China wood oil was heated at 225° C. for 20 minutes, at the end of which time the mixture was pulled from the fire, allowed to cool to about 200° C., and reduced with an equal weight of a solvent mixture comprising equal parts of Hi-flash naphtha and turpentine substitute. When the varnish prepared as described above had cooled to room temperature, a sufficient amount of cobalt linoleate drier solution was added to give 0.01% cobalt based on the weight of the oil, and the varnish sprayed over steel and over stained, filled mahogany. The varnish dried tack-free in about seven hours as compared to ten hours for a similar varnish containing rosin.

While this invention has been illustrated in the above examples with only abietyl alcohol, varnishes of good quality, though sometimes drying somewhat more slowly, may also be obtained if the abietyl alcohol of the examples is replaced by a hydroabietyl alcohol such as dihydroabietyl and tetrahydroabietyl alcohols. By "hydroabietyl alcohol" as used in the present description and claims is meant an abietyl alcohol whose unsaturation is wholly or partially removed by hydrogenation. Furthermore, the process is generally applicable to the preparation of oleoresinous varnishes from alcohols obtainable by the carboxylic reduction (catalytic or otherwise) of natural acidic resins in general, e. g., Kauri, Manila, Congo, Sandarac, Damar, Pontianac, Sierra Leone, Zanzibar, etc. The alcohols from these additional natural acidic resins in turn may or may not have their unsaturation wholly or partially removed by hydrogenation.

In place of the China wood oil and linseed oil of the examples, other drying oils such as oiticica oil, Japanese wood oil, perilla oil, walnut oil, safflower seed oil, cedar nut oil, etc., may be used. Semi-drying oils such as cottonseed oil, corn oil, and soya bean oil may be used as partial substitutes for the drying oil in these varnishes, but when such substitution is made a decrease in the drying rate of the varnish is obtained.

The proportion of oil to abietyl, hydroabietyl, or other alcohol from a natural acidic gum in these varnishes may be varied over wide limits, but it preferably constitutes no less than about 10% of the combined oil and resin alcohol content of the varnish. In the case of varnishes containing substantial quantities of China wood oil, the resin alcohol such as abietyl or hydroabietyl alcohol preferably constitutes in general no less than about 15% to 20% of the combined oil and resin alcohol content of the varnish, as otherwise the varnish has a tendency to show frosting on drying. When the proportion of the resin alcohol such as abietyl alcohol exceeds about 90% of combined oil and resin alcohol content of the varnish, products are obtained which are highly water-sensitive and which dry to somewhat brittle films. The preferred limits of abietyl or hydroabietyl alcohol lie between 15% and 40% of the combined oil and hydroabietyl or abietyl alcohol content of the varnish. This is also applicable to the other resin alcohols.

The liquid japan driers used in the examples are solutions of cobalt linoleate in a suitable solvent such as turpentine or mineral spirits. However, the driers need not be added to the varnish in the form of solutions, since they may be equally well incorporated by cooking them into the oil during or before blending with the abietyl or hydroabietyl alcohol. In place of the cobalt linoleate of the examples, the tungates, resinates, naphthenates, oleates of cobalt, lead, manganese, iron, nickel, etc., may be used.

While the examples indicate the preferred method of making the varnishes, i, e., that of combining the alcohol and the drying oil by heating at an elevated temperature, the varnish may also be made by independently dissolving the abietyl or other resin alcohol and the drying oil and combining the solutions at room temperatures. In the case of combination by heating, temperatures other than those indicated in the examples may be used without departing from the spirit or scope of the invention. The thinners, i. e., Hi-flash naphtha and turpentine substitute disclosed in the examples may be replaced by other thinners, such as mineral spirits, benzene, turpentine, xylene, solvent naphtha, and the like.

The varnishes of the present invention may be combined with one or more of the following substances: cellulose derivatives, e. g., nitrocellulose, ethyl cellulose, benzyl cellulose, etc.; natural and synthetic resins, e. g., rosin, kauri, vinyl resins, coumarone-indene resins, polyhydric alcohol-polycarboxylic acid resins, acrylic and polyacrylic acid ester polymers, urea-formaldehyde resins, phenol-formaldehyde resins, etc.; natural and synthetic waxes, e. g., Montan wax, beeswax, candelilla wax, lauryl stearate, etc.; hydrogenated natural and synthetic resins, e. g., hydrogenated rosin, hydrogenated phenol-formaldehyde resins, etc. To the varnishes per se combined with any one of the above enumerated materials may be added pigments, dyes, fillers, etc., as needed and desired. It is to be mentioned that highly valuable pigmented enamels may be made using these varnishes as the vehicle.

While the principal use for the varnishes of the present invention is in the manufacture of coating compositions, they are useful per se or combined with the materials above disclosed as impregnating and coating agents for paper, cloth, wood, porous stone, regenerated cellulose, rubberized fabrics, etc.; as sandwiching material or adhesives therefor in the manufacture of shatterproof glass; as plastics for the manufacture of floor coverings; as adhesive cements and sealing waxes for general use; and as binding agents for mica, asbestos, and the like in the manufacture of insulating materials, and for cotton flock in the manufacture of artificial suede, etc.

These varnishes, and particularly the varnishes containing China wood oil are superior to similar varnishes made from the natural acidic resin itself in drying qualities, flexibility, gloss, color, and viscosity characteristics. All of these are of definite commercial importance. Thus, abietyl alcohol-China wood oil varnishes dry about twice as fast as rosin-China wood oil varnishes, are lighter in color, are of definitely lower viscosity, give more flexible films, and these films have higher gloss and better apparent build.

The above description and examples are intended to be illustrative only. Any modification of or variation therefrom which conforms to the spirit of the invention is intended to be included within the scope of the claims.

I claim:

1. Process of preparing an oleoresinous varnish, which comprises heating approximately one part of abietyl alcohol with approximately two parts of China wood oil for 20 minutes at approximately 225° C., cooling, thinning with approximately three parts of a varnish thinner, then adding 0.01 part of cobalt as cobalt linoleate drier solution.

2. Process of preparing an oleoresinous varnish, which comprises heating 15 to 40 parts of abietyl alcohol with 85 to 60 parts of China wood oil at an elevated temperature, thinning with an approximately equal weight of a varnish thinner and adding a drier.

3. An oleoresinous varnish comprising a drying oil and an alcohol obtainable from a natural acidic resin by hydrogenation said varnish having improved drying time, lower viscosity, lighter color, greater film flexibility, higher gloss of film and better build of film as compared with a varnish wherein the alcohol is replaced by the acidic resin.

4. An oleoresinous varnish comprising a drying oil and an alcohol obtainable from rosin by hydrogenation said varnish having improved drying time, lower viscosity, lighter color, greater film flexibility, higher gloss of film and better build of film as compared with a varnish wherein the alcohol is replaced by rosin.

5. An oleoresinous varnish comprising a drying oil and abietyl alcohol said varnish having improved drying time, lower viscosity, lighter color, greater film flexibility, higher gloss of film and better build of film as compared with a varnish wherein the abietyl alcohol is replaced by rosin.

6. An oleoresinous varnish comprising 85 to 60 parts of a drying oil and 15 to 40 parts of abietyl alcohol said varnish having improved drying time, lower viscosity, lighter color, greater film flexibility, higher gloss of film and better build of film as compared with a varnish wherein the abietyl alcohol is replaced by rosin.

7. An oleoresinous varnish comprising a drying oil and hydroabietyl alcohol said varnish having improved drying time, lower viscosity, lighter color, greater film flexibility, higher gloss of film and better build of film as compared with a varnish wherein the hydroabietyl alcohol is replaced by rosin.

8. An oleoresinous varnish comprising 85 to 60 parts of a drying oil and 15 to 40 parts of hydroabietyl alcohol said varnish having improved drying time, lower viscosity, lighter color, greater film flexibility, higher gloss of film and better build of film as compared with a varnish wherein the hydroabietyl alcohol is replaced by rosin.

9. An oleoresinous varnish comprising China wood oil and an alcohol obtainable from a natural acidic resin by hydrogenation said varnish having improved drying time, lower viscosity, lighter color, greater film flexibility, higher gloss of film and better build of film as compared with a varnish wherein the alcohol is replaced by the acidic resin.

10. An oleoresinous varnish comprising China wood oil and an alcohol obtainable from rosin by hydrogenation said varnish having improved drying time, lower viscosity, lighter color, greater film flexibility, higher gloss of film and better build of film as compared with a varnish wherein the alcohol is replaced by rosin.

11. An oleoresinous varnish comprising 85 to 60 parts of China wood oil and 15 to 40 parts of an alcohol obtainable from rosin by hydrogenation said varnish having improved drying time, lower viscosity, lighter color, greater film flexibility, higher gloss of film and better build of film as compared with a varnish wherein the alcohol is replaced by rosin.

12. An oleoresinous varnish comprising China wood oil and abietyl alcohol said varnish having improved drying time, lower viscosity, lighter color, greater film flexibility, higher gloss of film and better build of film as compared with a varnish wherein the abietyl alcohol is replaced by rosin.

13. An oleoresinous varnish comprising 85 to 60 parts of China wood oil and 15 to 40 parts of abietyl alcohol said varnish having improved drying time, lower viscosity, lighter color, greater film flexibility, higher gloss of film and better build of film as compared with a varnish wherein the abietyl alcohol is replaced by rosin.

14. An oleoresinous varnish comprising China wood oil and hydroabietyl alcohol said varnish having improved drying time, lower viscosity, lighter color, greater film flexibility, higher gloss of film and better build of film as compared with a varnish wherein the hydroabietyl alcohol is replaced by rosin.

15. An oleoresinous varnish comprising 85 to 60 parts of China wood oil and 15 to 40 parts of hydroabietyl alcohol said varnish having improved drying time, lower viscosity, lighter color, greater film flexibility, higher gloss of film and better build of film as compared with a varnish wherein the hydroabietyl alcohol is replaced by rosin.

HENRY S. ROTHROCK.